United States Patent
Natanson et al.

(10) Patent No.: US 6,546,015 B1
(45) Date of Patent: Apr. 8, 2003

(54) LAN EMULATION BROADCAST AND UNKNOWN SERVER

(75) Inventors: Sarit Shani Natanson, Tel Aviv (IL); Ronit Aizicovich, Ramat Gan (IL); Henic Roizman, Mevasseret Zion (IL); Raphi Hess, Ganei Tikva (IL)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/418,107

(22) Filed: Oct. 14, 1999

(51) Int. Cl.[7] .............................................. H04L 12/56
(52) U.S. Cl. .................................. 370/395.53; 370/390
(58) Field of Search .................................. 370/390, 389, 370/395.1, 395.3, 395.31, 395.5, 395.52, 395.53, 395.54, 395.6, 466, 474, 395, 406

(56) References Cited

U.S. PATENT DOCUMENTS

| | | | | |
|---|---|---|---|---|
| 5,805,805 A | * | 9/1998 | Civanlar et al. ............ | 370/409 |
| 6,223,218 B1 | * | 4/2001 | Iijima et al. ................ | 709/221 |
| 6,285,674 B1 | * | 9/2001 | Soni et al. .................. | 370/390 |
| 6,456,962 B1 | * | 9/2002 | Allingham et al. ........... | 703/26 |

OTHER PUBLICATIONS

CISCO IOS Switching Services Configuration Guide, LAN Emulation Overview, pp. XC–59–65.
LAN Emulation OVER ATM Version 2—LUNI Specification—Letter Ballot, AF–LANE–0084.000, pp. 25–26, 29–33, 88–101.
LAN Emulation Over ATM, 1996, pp. 1–11.

* cited by examiner

Primary Examiner—Wellington Chin
Assistant Examiner—William Schultz
(74) Attorney, Agent, or Firm—Howard Zaretsky; Paul J. Sutton

(57) ABSTRACT

A novel BUS entity utilizing the forwarding engine in a conventional LAN switch incorporating an ATM interface. The forwarding engine is adapted to assemble Ethernet frames from ATM cells and to segment Ethernet frames back to ATM cells. The switching fabric in a conventional LAN switch is adapted to perform the segmentation and re-assembly (SAR) function of the BUS whereby ATM cells are assembled into Ethernet frames, switched and segmented back to ATM cells. In operation, one or more Multicast Send VCCs transmit traffic destined for the BUS to the modified LAN switch of the present invention. The switching fabric is configured to switch the received traffic to an appropriate outbound Etheret port. The outbound Ethernet port is looped backed to itself and input to the switching fabric. Switching fabric is configured to output the traffic to the appropriate Multicast Forward VCC for distribution to the LECs.

17 Claims, 5 Drawing Sheets

LAN EMULATION BROADCAST AND UNKNOWN SERVER

FIELD OF THE INVENTION

The present invention relates generally to data communications networks and more particularly relates to an apparatus and related method for implementing a LAN Emulation Broadcast and Unkown Server (BUS) in an Asynchronous Transfer Mode (ATM) network.

BACKGROUND OF THE INVENTION

Asynchronous Transfer Mode

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in Private Network Node Interface (PNNI) Phase 0 and Phase 1 specifications published by ATM Forum. The previous Phase 0 draft specification is referred to as Interim Inter-Switch Signaling Protocol (IISP). The goal of the PNNI specifications is to provide customers of ATM network equipment some level of multi-vendor interoperability.

LAN Emulation

Today, most data traffic in existing customer premises networks travels over legacy LANs. It is desirable to permit these legacy LANs and their embedded infrastructure to operate with new ATM networks currently being deployed. To enable an easier migration path to ATM, the ATM Forum has defined LAN Emulation (LANE) specification that allows ATM networks to coexist with legacy systems. The LANE specification defines a way for an ATM network to emulate a logical Ethernet or Token Ring segment, these currently being the most popular LAN technologies.

LANE service provides connectivity between ATM capable devices and legacy LAN capable devices across an ATM network. Since LANE connectivity is defined at the MAC layer, the upper protocol layer functions of LAN applications can continue to function unchanged after the device joins an emulated LAN. This important feature protects corporate investments in legacy LAN applications. An ATM network can support multiple independent emulated LAN (ELAN) networks. A network may have one or more emulated LANs wherein each emulated LAN is separate and distinct from the others. Emulated LANs communicate via routers and bridges just as they do in physical LANs. The emulated LAN provides communication of user data frames between its users just as in an actual physical LAN.

Emulation over ATM networks, the LANE Version 1.0 standard drafted by the ATM Forum and incorporated herein by reference, defines the LANE architecture and a set of protocols used by the LANE entities. LANE uses a client/server model to provide its services. A block diagram illustrating prior art Version 1.0 LAN Emulation services available to nodes in an ATM network is shown in FIG. 1. The network, generally referenced 10, comprises an ATM network cloud (not shown) which includes a plurality of LECs 14 labeled LEC #1 through LEC #3 and a plurality of nodes 12 labeled node #1 through node #9 connected to LECs #1 through #3. The LECs am connected to a LAN Emulation services block 16 which comprises LECS 18, LES 20 and BUS 22.

The entities defined by the LANE architecture include LAN Emulation Clients (LECs) 14, a LAN Emulation Server (LES) 20, a Broadcast and Unknown Server (BUS) 22 and LAN Emulation Configuration Server (LECS) 18. The LES, BUS and LECS constitute what is known as the LANE Service (block 16).

Each LAN Emulation Client (LEC) represents a set of users, as identified by their MAC addresses. A LEC emulates a LAN interface that communicates with higher layer protocols such as IP, IPX, etc. that are used by these users. To achieve this task, the LEC communicates with the LANE Services and to other LECs. LECs communicate with each other and to the LANE Services via ATM Virtual Channel Connections (VCCs). The VCCs are typically Switched Virtual Circuits (SVCs), but Permanent Virtual Connections (PVCs) might also be used for this purpose.

In order for a LEC to participate in an emulated LAN, the LEC must first communicate with an LECS. It may utilize a specific ATM address of the LECS if it knows it, or, as is typically the case, may use the well known address of the LECS to establish communications.

As described previously, the LANE Service comprises several entities: LANE Server (LES), a Broadcast and Unknown Server (BUS) and LAN Emulation Configuration Server (LECS). The LES provides Joining, Address Registration and Address Resolution services to the LECs. Note that a given LES serves only a single emulated LAN.

The LES implements the control coordination function for the ELAN by providing a mechanism for registering and resolving unicast MAC addresses to ATM addresses. An LEC is connected to only one LES entity and may register LAN destinations it represents and multicast MAC addresses it wishes to receive. A LEC also queries its LES when the LEC needs to resolve a MAC address to an ATM address. The LES either responds directly to the LEC or forwards the query to other LECs so they may respond.

The BUS functions to sequence and distribute data sent by LECs to the broadcast MAC address 'FFFFFFFFFFFF', multicast data (to provide the connectionless data delivery characteristics of a shared network) and unicast data sent by a LEC before a data direct VCC has been established. Note that a given BUS serves only one emulated LAN. The main functions of the BUS include distributing data with multicast MAC (MMAC) addresses, initial unicast data (where the MAC address has not yet been resolved to a direct ATM connection) and to distribute data.

In operation, all LECs send data frames to the BUS entity which is operative to serialize the frames and re-transmit them directly or indirectly to other LECs. Note that serialization is necessary in order to prevent the cells making up the AAL5 frames originating from different sources from being interleaved. The BUS entity participates in the LE Address Resolution Protocol (LE ARP) to enable an LEC to locate its BUS. The BUS must also handle ATM connections and manage its distribution group.

Note that the BUS entity may have multiple interfaces which support receiving and forwarding of specific multicast MAC addresses frames over multiple VCCs. If a LEC does not need to receive all multicast MAC addresses frames, it may inform the LES during initialization (in LANE Version 2.0 discussed below). The LES then selectively forwards multicast MAC address frames to only those LECs that have requested them.

In sum, all broadcast multicast and unknown traffic to and from a LEC passes through the BUS entity. Therefore, if the processing capabilities of the BUS are limited, a potential bottleneck may arise that severely effects the performance of the network.

The LECS contains the database used in determining which emulated LAN a device belongs to. Each LEC consults the LECS once, at the time it joins an emulated LAN, to determine which emulated LAN it should join. The LECS assigns the LEC to a given emulated LAN by giving the LEC the ATM address of the LES associated with that particular emulated LAN. Different policies may be utilized by the LECS in making the assignment. The assignment may be based on the LECs physical location, i.e., ATM address, the LEC ID, i.e., the MAC address, or any other suitable criteria. Note that the LECS serves all the emulated LANs defined for the given administrative ATM network domain.

The straightforward implementation of the LANE Version 1.0 specification includes a single LECS for the entire administrative domain and a single LES per emulated LAN. A disadvantage of this implementation is that it suffers from a single point of failure for both the LECS and the LES. Failure of the LECS might take the entire network down while failure of the LES takes the entire emulated LAN down.

The LES implements the control coordination function for the ELAN. The LESs provide a facility for registering and resolving unicast and multicast MAC addresses to ATM addresses. A LEC is connected to only one LES and may register LAN destinations it represents and multicast MAC addresses it wishes to receive with its LES. A LEC will also query its LES when the LEC wishes to resolve a MAC address to an ATM address. The LES either responds directly to the LEC or forwards the query to other LECs so they may respond.

A block diagram illustrating the relationship between LEC, LECS, LES and BUS entities in prior art Version 1.0 LAN Emulation services is shown in FIG. 2. Two LECs 30 are shown in communication with each other in addition to an LECS 32, LES 34 and BUS 36. The protocol the LECs use to communicate with each other and to the LAN Emulation services is known as LAN Emulation User to Network Interface (LUNI). The scope of the LUNI is indicated by the dashed line 38.

A characteristic feature of these types of implementations, however, is that when a LES fails, all the LECs connected to it try to rejoin the emulated LAN by connecting to the LECS. The LECS, however, assigns these LECs to the same non operative LES. The connection fails and the process continues endlessly.

The LANE Version 2.0 draft specification addresses the single point of failure problem for the ELAN by defining a distributed architecture for the LANE services. Since the clients (LECs) should be effected by the particular implementation used to provide the services, the ATM Forum decided to split the LANE specification into two sub specifications: (1) LAN Emulation User to Network Interface (LUNI) and (2) LAN Emulation Network to Network Interface (LNNI).

The LUNI specification defines the interface between the LEC and the LANE Services and between the LEC and other LECs. The LNNI specification defines the interface between LANE Services entities, i.e., LECs, LESs, BUSs, etc. In addition, LNNI defines a new LAN Emulation Service entity, i.e., the Selective Multicast Server (SMS), to enhance the handling of Multicast traffic.

A block diagram illustrating the relationship between LEC, LECS, LES, BUS and SMS entities in prior art Version 2.0 LAN Emulation services is shown in FIG. 3. Two LECs 40 are shown in communication with each other and to either of two LECS 42, LES 44 and BUS 46. In addition, both LECs and the LECS, LES and BUS communicate with a Selective Multicast Server (SMS) entity 48. Note that there can be more than one SMS per ELAN.

Communications among LANE components is normally handled via several types of SVCs, i.e., unidirectional, bidirectional, point-to-point (P2P) and point-to-multipoint (P2M), also known as VCCs. The LES communicates with each individual LEC via a control direct VCC 49 and with all LECs collectively via control distribute VCC 47; the BUS communicates with each individual LEC via a multicast send VCC 45 and with all LECs collectively via multicast forward VCC 43; and two individual LECs communicate with each other via a data direct VCC 41.

A brief description of the process normally performed to enable a LEC will now be presented. Initially, the LEC sends a configuration request message to the LECS to request to join an ELAN and obtain the ATM address of the LES for its ELAN. The message is sent over a bidirectional P2P Configure Direct VCC to the LECS. Using the same VCC, the LECS returns, via a configuration response message, the ATM address and the name of the LES for the ELAN associated with the LEC.

The LEC then sets up a bidirectional P2P Control Direct VCC to the LES associated with its ELAN for the purpose of exchanging control traffic. Once a Control Direct VCC is established between a LEC and LES, it remains up. The LEC then attempts to join the ELAN via join request and response messages to and from the LES. The LES for the ELAN sets up a bidirectional P2P Configure Direct VCC to the LECS to verify that the client is permitted to join the ELAN. The configuration request from the LES contains the MAC address of the LEC, its ATM address and the name of the ELAN. The LECS checks its database and determines if the LEC can join that particular ELAN. It uses the same VCC to reply to the LES whether the LEC is or is not permitted to join.

If the join is permitted, the LES adds the LEC to the unidirectional P2M Control Distribute VCC and confirms the join over the bidirectional P2P Control Direct VCC. If not permitted, the LES rejects the join over the bidirectional P2P Control Direct VCC. The LES sends configuration data, e.g., LEC_ID, ELAN_ID, etc., to the LEC. The LEC then sends LE_ARP packets for the broadcast address that causes VCCs to be set up between the LEC and the BUS entity.

During communications on the ELAN, each LEC builds a local LE_ARP table that maps MAC addresses to ATM addresses. When a LEC first joins an ELAN, its LE_ARP table does not contain any entries and it has no information about destinations on or behind its ELAN. The LEC uses the LE_ARP process to learn about the destination when a packet is to be transmitted, i.e., to find the ATM address corresponding to the known MAC address.

The LEC first sends an LE_ARP request to the LES over the Control Direct VCC. The LES forwards the LE_ARP request to all the LECs on the ELAN over the Control Distribute VCC. Any LEC that recognizes the MAC address responds with its ATM address over the Control Direct VCC. The LES forwards the response over the Control Distribute VCC. The LEC, upon receipt, adds the MAC address/ATM address pair to its LE_ARP cache. The LEC is then able to establish a Data Direct VCC to the desired destination and begin sending packets to the ATM address.

When a LEC wants to transmit broadcast, multicast or unicast traffic with an unknown address, it first sends the packet to the BUS over the Multicast Send VCC. The BUS forwards, i.e., floods, the packet to all LECs over the Multicast Forward VCC. Note that this VCC branches at each ATM switch. The switch is operative to forward the packets to multiple outputs.

Note that in connection with the LNNI scheme, there may be several LECSs defined per administrative ATM domain in addition to several active LESs defined per ELAN. Each LECS maintains the list of currently active LESs. In case a LES fails, a mechanism is defined to ensure that all the LECSs are notified of the failure in order that none of the LECS assign LECs to non operational LESs. All the LECs previously connected to the failed LES are re-assigned by the LECS to other active LESs.

As described above, in the LANE Version 1.0 architecture (see FIGS. 1 and 2), the BUS is responsible for handling three type of traffic: broadcast, multicast and unknown unicast. The multicast traffic is generated by one or more applications that send their data to a group of receivers. The group of receivers does not include all the clients of the ELAN. For example, these applications include but are not limited to video broadcasting, distribution of data information, e.g., software distribution or push technology, video conferencing, remote learning, etc.

It is expected that these applications will increase in popularity in the near future. Therefore, the amount of multicast traffic is expected to also increase to a large extent. If multicast traffic were to grow, based on the LANE Version 1.0 implementation, the BUS would quickly become a bottleneck for traffic when the total amount of multicast traffic on the ELAN exceeds the forwarding power of the BUS.

Note that it is expected that in the near future Multicast traffic will become very heavy in networks. Broadcast traffic occurs mainly in the startup phase of the network and network elements. Once operating, little continuous broadcast traffic is generated. Similarly, unknown traffic is also not generated on a continuous basis. Unknown traffic is generated, for example, by a network element before a direct connection is established between two network devices.

In addition, multicast traffic is currently handled as broadcast traffic. All multicast traffic defaults to the BUS (to the LES for unicast traffic). In other words, regardless of the size and membership of the multicast group, a multicast message is broadcast to all the LECs and all members attached to the LECs.

To summarize, the disadvantage of LANE Version 1.0 is (1) the lack of true multicast capability (multicast is treated as broadcast) and (2) the lack of redundancy (if a LES or BUS fails the entire ELAN goes down). In particular, multicast traffic is limited by the forwarding capability of the BUS and by the slowest downlink to a LEC. Further, in switched edge device, all multicast traffic is distributed to all the ports.

Since, however, up till now relatively little multicast traffic was generated, the redundancy problem was considered far more important. Today, however, and in the near future the inorcase in milticast traffic generated by applications which cause the first problem, i.e., lack of true multicast, to become an important problem as well.

The LNNI portion of LANE Version 2.0 addresses these issues by providing a means of offloading the multicast traffic from the BUS. With reference to FIG. 3, this is achieved by the addition of one or more Selective Multicast Servers (SMSs) 48 that are responsible for handling multicast traffic.

A standard prior art SMS (and BUS) is constructed to perform the following functions. SMSs are designed to forward traffic on a packet level as opposed to forwarding traffic on a cell level. SMSs utilize a heavy protocol known as Server Cache Synchronization Protocol (SCSP). In LNNI most of the information between entities, i.e., LES, SMS, LECS, is transferred using this protocol. This protocol is needed to enable the SMS and LES to reside on difference network devices. In addition, SMSs introduce themselves to the LECS after obtaining the LES(s) from the LECS. After this first introduction they introduce themselves again to the LES(s) themselves. Further, SMSs must forward multicast traffic to the BUS to ensure backward compatibility with non-SMS enabled LECs.

Both the BUS and SMS comprise, among other things a segmentation and re-assembly (SAR) unit. As described above, a major function of the SMS is to receive and distribute multicast traffic.

In operation, one or more LECs establish connections to the BUS. Cells forwarded to the BUS from one or more LECs are received and input to the SAR. A re-assembly unit functions to reassemble the cells into packets. The cells are not forwarded until all cells comprising a packet are received. The BUS cannot multiplex different multicast traffic streams on the cell level, thus the requirement for an SAR in prior art BUS entities. It can, however, multiplex on the packet level.

Once all cells making up a packet have arrived, the packet is then segmented into cells and distributed to each receiver, i.e., member, in the particular multicast group associated with the packet.

For traditional LAN traffic, AAL5 is the means used by which Ethernet and Token Ring frames are encapsulated into ATM cells. AAL5, however, does not provide any multiplexing capabilities. This means that cells derived from a particular frame are queued until all have arrived at the SAR before the packet is passed to the segmentation unit and transmitted as cells to the plurality of multicast destinations, i.e., receivers.

Note that in practice, the BUS (and SMS) may be implemented in various devices but typically, it is implemented in ATM switches. More than one BUS and SMS may reside in a network with each BUS and SMS residing on a different switch.

Initially, the LEC requests the LES for a destination for sending multicast traffic. The LES responds with the address of an SMS. The SMS maintains a list of Multicast Media Access Control (MMAC) addresses, wherein each MMAC represents a multicast group. It is possible that several SMSs serve the same MMAC so as to provide load balancing in the event the output demand exceeds any one SMS.

The LESs have knowledge of the locations of the SMSs and the MMACs handled by each. When an LE_ARP_REQ message arrives at a LES from a LEC for a particular MMAC, the LES replies with the ATM address of the BUS (SMS). If the LES does know about any SMSs, it sends the LEC the ATM address of the BUS. Thus, the BUS is the default in the event an SMS cannot be assigned.

In a network with multicast, the sending and receiving functions are independent of each other. In other words multicast connections may involve overlapping LECs or they may involve totally non overlapping LECs. The same LEC may function as a sender and a receiver for a single multicast connection or for multiple multicast connections.

Once the LEC obtains the ATM address of the SMS, it establishes a point to point connection to the SMS. The LEC then sends multicast traffic to the SMS over that connection.

By default, the LEC receives all multicast traffic. In some cases, e.g., LANE Version 2.0 or a LEC in selective multicast mode, the LEC must issue an LE_REGISTER_REQ message for a particular MMAC and send it to the LES in order to listen to a particular multicast. The LES, using the LNNI SCSP protocol, instructs the SMS to add the LEC to the point to multipoint connection.

A disadvantage of the above scheme is that the BUS or SMS is required to perform re-assembly and segmentation of the cells into packets and back into cells. The BUS or SMS perform packet switching that involves the use of a combination of software and hardware. The need to process the packets using software creates a large potential bottleneck and a limitation on the forwarding capabilities of the BUS or SMS.

A further disadvantage is that the current prior art scheme is not scalable as three types of traffic, i.e., broadcast, multicast and unknown, are handled by a single entity. In addition, each LEC receives all the multicast traffic resulting in very inefficient utilization of bandwidth and the wasting of CPU resources on the end station due to the required software filtering of the MMACs.

SUMMARY OF THE INVENTION

The present invention solves the problems associated with the prior art by providing an apparatus for and a method of implementing a BUS entity utilizing a conventional LAN switch engine incorporating an ATM interface. The forwarding engine in a conventional LAN switch is utilized to assemble Ethernet frames from ATM cells and fragmentize Ethernet frames back to ATM cells. The switch also functions to forward ATM cells received on a specific VPI/VCI connection to an Ethernet port associated with the VPI/VCI and to forward Ethernet frames received from a specific Ethernet port to a specific VPI/VCI associated with the Ethernet port.

A conventional LAN switch and ATM switch are modified and adapted to implement the BUS entity of the present invention. The BUS entity comprises a BUS engine that incorporates the following functionality: (1) a segmentation and re-assembly (SAR) device so as not to have interleaving frames, and (2) a high performance forwarding engine having fast switching times and low latency. The SAR device and forwarding engine are built into the majority of commercially available LAN/ATM switches.

In accordance with the present invention, the BUS engine is connected on one side to a physical ATM port and on the other side to Ethernet ports that are connected internally or externally via loopback. In operation, the BUS engine assembles Ethernet frames from ATM cells received from the ATM port. It then forwards the Ethernet frames to an Ethernet interface port. Due to the loopback configuration, the Ethernet frame is returned to the BUS engine which is operative to divide the Ethernet frame into a plurality of ATM cells. The ATM cells are then forwarded to the ATM port.

Thus, the switching fabric in the LAN switch is adapted to perform the segmentation and re-assembly (SAR) function of the BUS whereby ATM cells are assembled into Ethernet frames, switched and segmented back to ATM cells. In operation, one or more Multicast Send VCCs transmit traffic destined for the BUS to the modified LAN switch of the present invention. The switching fabric is configured to switch the received traffic to an appropriate outbound Ethernet port. The outbound Ethernet port is looped backed to itself and input to the switching fabric. The switching fabric is configured to output the traffic to the appropriate Multicast Forward VCC for distribution to the LECs.

There is provided in accordance with the present invention a Broadcast and Unknown Server (BUS) entity connected to an Asynchronous Transfer Mode (ATM) network including one or more LAN Emulation Clients (LECs), the BUS comprising a BUS manager operative to establish a Multicast Send Virtual Channel Connection (VCC) and a Multicast Forward VCC to a first LEC, establish a first coupling VCC connecting the Multicast Send VCC to a BUS engine, establish a second coupling VCC connecting the BUS engine to the Multicast Forward VCC; an ATM switch matrix operative to forward traffic received over the Multicast Send VCC to the first coupling VCC, forward traffic received from the second coupling VCC to the Multicast Forward VCC, an Ethernet port including a transmit portion and a receive portion, the Ethernet port adapted to be in loop back configuration; and the BUS engine operative to forward traffic received over the first coupling VCC to the transmit portion of the Ethernet port and forward traffic received from the receive portion of the Ethernet port to the second coupling VCC.

The Ethernet port can be configured in external loopback or in internal loopback. The BUS engine comprises means for re-assembling ATM cells to form Ethernet frames and means for segmenting Ethernet frames into ATM cells. The BUS engine comprises an ATM to Ethernet forwarding table and an Ethernet to ATM forwarding table. The BUS manager may communicate with the BUS engine over the ATM network or via an internal data communication bus.

The BUS entity further comprising means for establishing additional Multicast Send VCCs, one Multicast Send VCC established for each additional LEC wishing to connect to the BUS entity and means for adding each additional LEC wishing to connect to the BUS entity to the Multicast Forward VCC.

There is further provided in accordance with the present invention, in an Asynchronous Transfer Mode (ATM) network including an ATM switch having a BUS manager, a BUS module having a BUS engine and at least one Ethernet port and one or more LAN Emulation Clients (LECs), a method of implementing a Broadcast and Unknown Server (BUS) entity, the method comprising the steps of establishing a Multicast Send Virtual Channel Connection (VCC) and a Multicast Forward VCC to a first LEC, establishing a first coupling VCC connecting the Multicast Send VCC to the BUS engine and a second coupling VCC connecting the BUS engine to the Multicast Forward VCC, forwarding traffic received over the Multicast Send VCC to the first coupling VCC, forwarding traffic received over the first coupling VCC to a transmit portion of the Ethernet port, adapting the Ethernet port to be in loopback configuration, forwarding traffic received from a receive portion of the Ethernet port to the second coupling VCC, forwarding traffic received from the second coupling VCC to the Multicast Forward VCC.

The step of forwarding traffic received over the first coupling VCC comprises the step of re-assembling ATM cells to form Ethernet frames. The step of forwarding traffic received from a receive portion of the Ethernet port comprises the step of segmenting Ethernet frames to form ATM cells.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout
The following notation is used throughout this document.

| Term | Definition |
| --- | --- |
| AAL | ATM Adaptation Layer |
| ANSI | American National Standards Institute |
| ARP | Address resolution Protocol |
| ATM | Asynchronous Transfer Mode |
| BUS | Broadcast and Unknown Server |
| CCITT | Comite Consulatif International Telegraphique et Telephonique |
| ELAN | Emulated Local Area Network |
| FDDI | Fiber Distributed Data Interface |
| IISP | Interim Inter-Switch Signaling Protocol |
| IP | Internet Protocol |
| IPX | Internetwork Packet Exchange |
| ITU | International Telecommunications Union |
| LAN | Local Area Network |
| LANE | LAN Emulation |
| LE | LAN Emulation |
| LEC | LAN Emulation Client |
| LECS | LAN Emulation Configuration Server |
| LES | LAN Emulation Server |
| LNNI | LAN Emulation Network to Network Interface |
| LUNI | LAN Emulation User to Network Interface |
| MAC | Media Access Control |
| MMAC | Multicast Media Access Control |
| OC | Optical Carrier |
| P2M | Point-to-Multipoint |
| P2P | Point-to-Point |
| PNNI | Private Network to Network Interface |
| PVC | Permanent Virtual Circuit |
| SAR | Segmentation and Reassembly |
| SCSP | Server Cache Synchronization Protocol |
| SMS | Selective Multicast Server |
| SVC | Switched Virtual Circuit |
| UNI | User to Network Interface |
| VCC | Virtual Channel Connection |
| VCI | Virtual Circuit Identifier |
| VPI | Virtual Path Identifier |

The present invention solves the problems associated with the prior art by providing an apparatus for and a method of implementing a BUS entity utilizing a conventional LAN switch engine incorporating an ATM interface. The forwarding engine in a conventional LAN switch is utilized to assemble Ethernet frames from ATM cells and fragmentize Ethernet frames back to ATM cells. The switch also functions to forward ATM cells received on a specific VPI/VCI connection to an Ethernet port associated with the VPI/VCI and to forward Ethernet frames received from a specific Ethernet port to a specific VPI/VCI associated with the Ethernet port.

Figure 1:
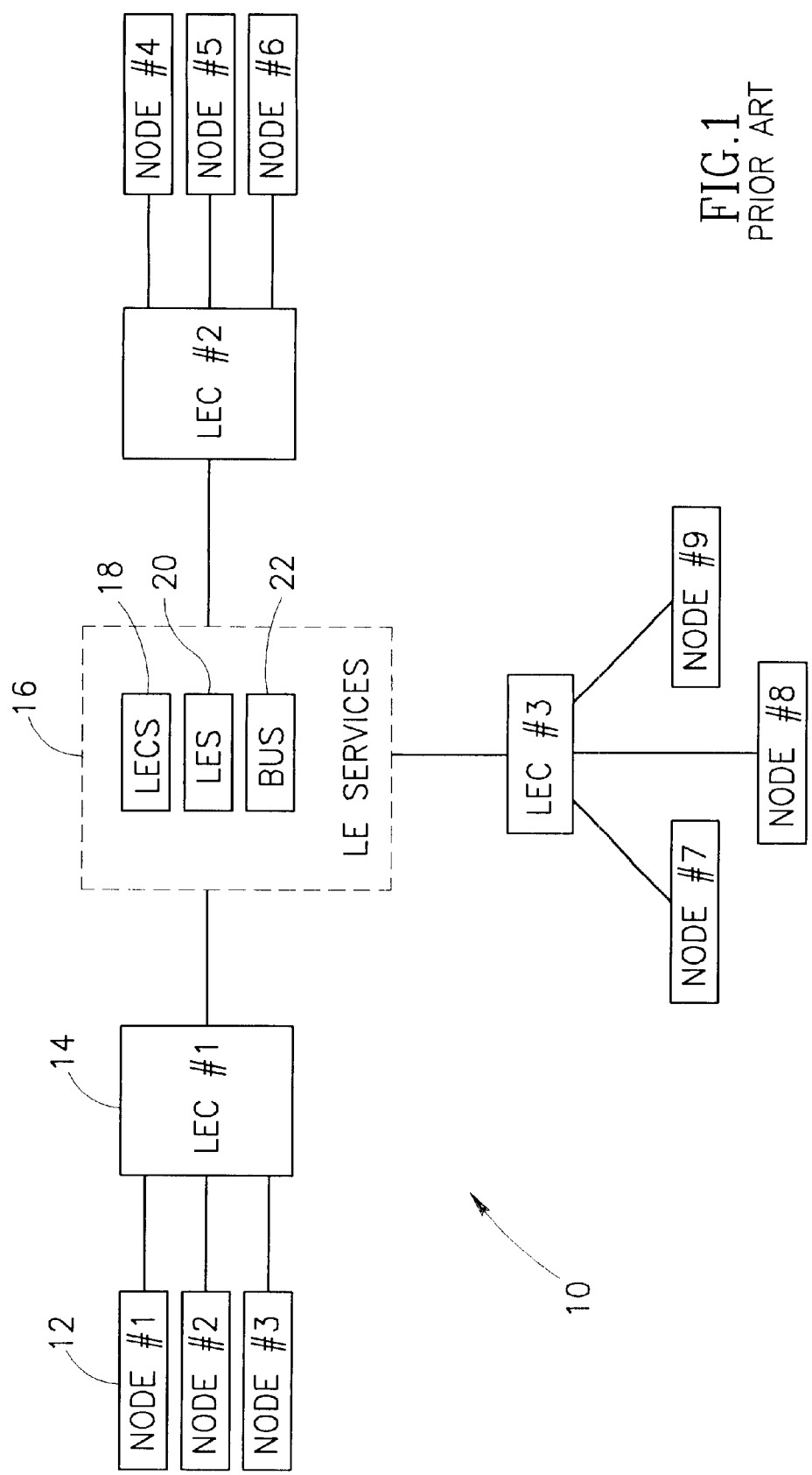
FIG. 1 is a block diagram illustrating prior art Version 1.0 LAN Emulation services available to nodes in an ATM network.
Figure 2:
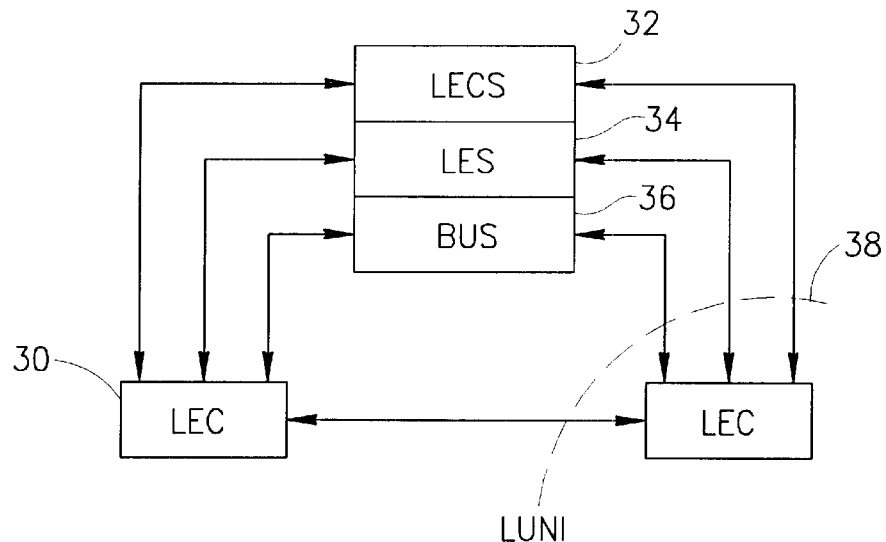
FIG. 2 is a block diagram illustrating the relationship between LEC, LECS, LES and BUS entities in prior art Version 1.0 LAN Emulation services.
Figure 3:
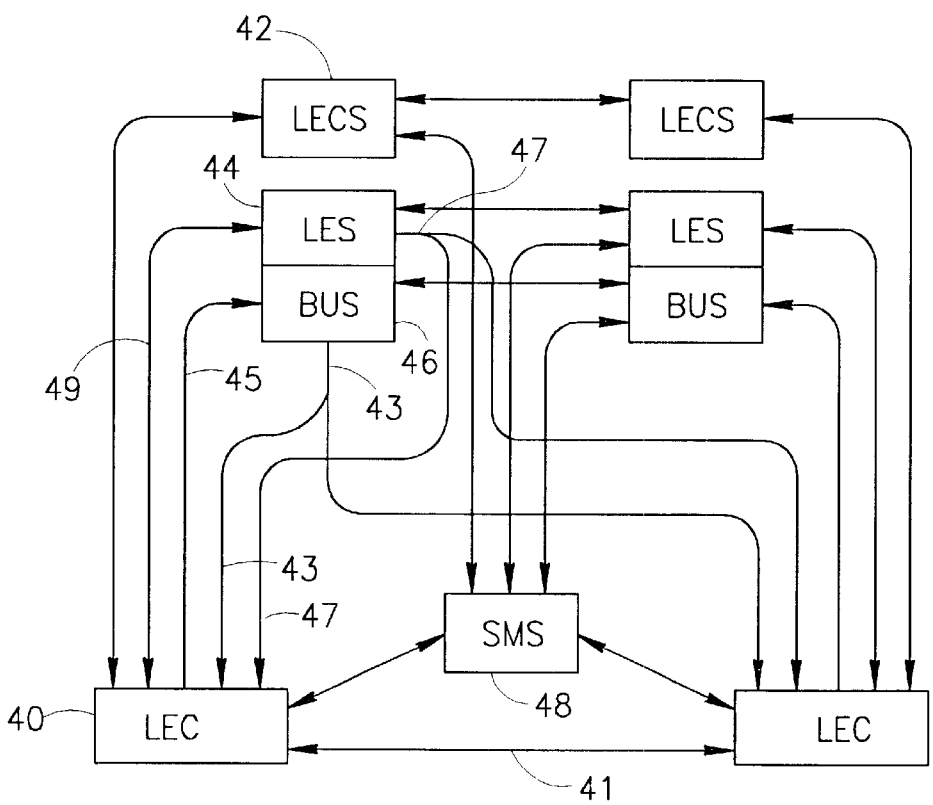
FIG. 3 is a block diagram illustrating the relationship between LEC, LECS, LES, BUS and SMS entities in prior art Version 2.0 LAN Emulation services.
Figure 4:
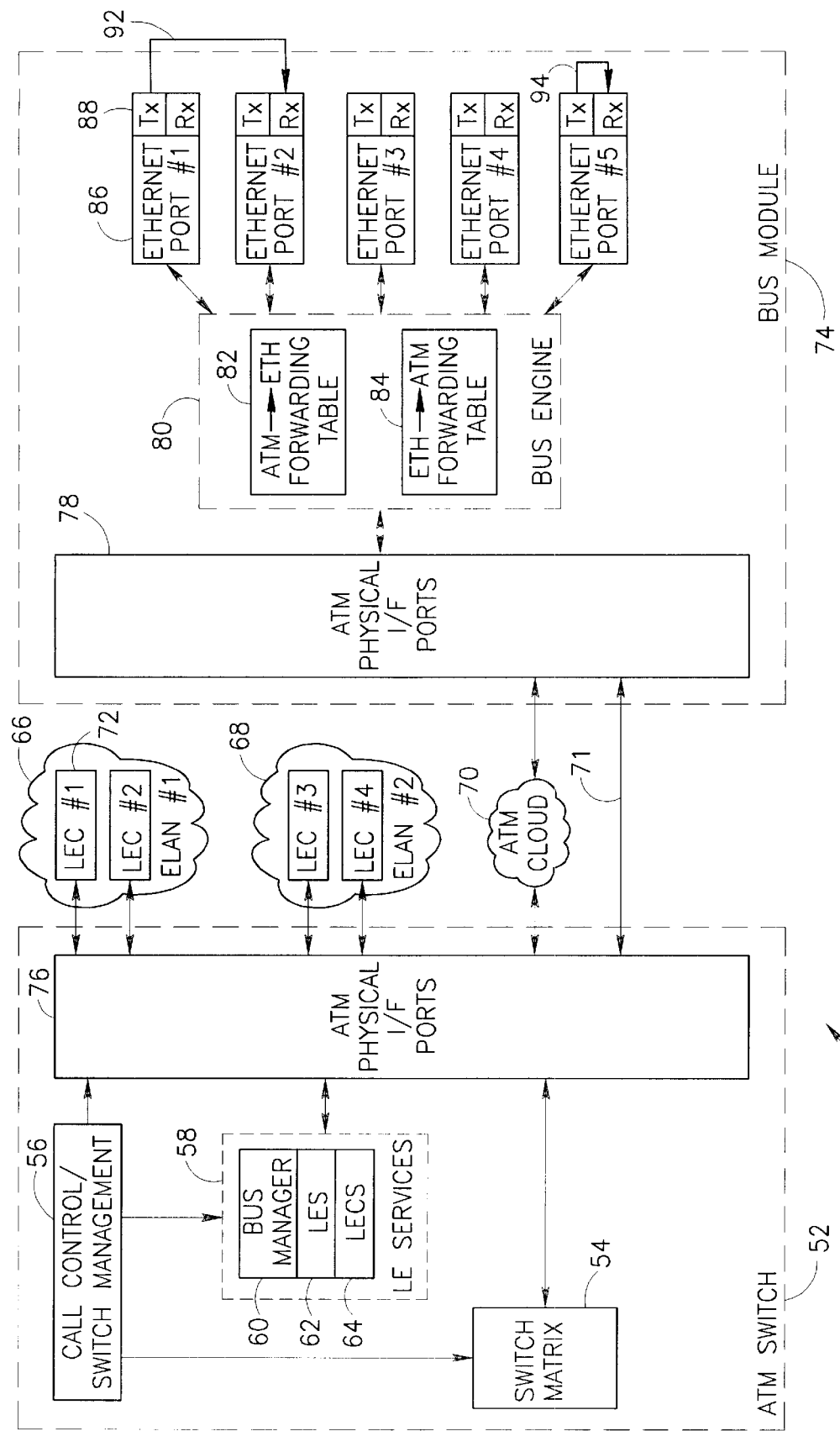
FIG. 4 is a block diagram illustrating an ATM switch in communication with a BUS module constructed in accordance with the present invention.

A block diagram illustrating an ATM switch in communication with a BUS module constructed in accordance with the present invention is shown in FIG. 4. The example network illustrated, generally referenced 50, comprises an ATM switch 52 coupled to an ATM cloud 70. For illustration purposes two ELANs, labeled ELAN #1 66 and ELAN #2 68, connected to the ATM switch. Although not indicated, the ELANs 66, 68 are considered to be within the ATM cloud 70. They have been drawn separately for clarity sake only. As an example, both ELANs are illustrated having two LECs 72: LEC #1 and LEC #2 in ELAN #1 and LEC #3 and LEC #4 in ELAN #2.

The ATM switch 52 comprises a switch matrix 54, call control/switch management unit 56, ATM physical interface ports 76 and LAN Emulation (LE) Services 58. The LE Services comprises a BUS manager 60 constructed in accordance with the present invention, conventional LES 62 and conventional LECS 64.

The BUS manager 60 typically comprises software that executes on the ATM switch. The software is adapted to implement the standard BUS functionality modified in accordance with the present invention so as to operate with the BUS module 74. The ATM switch matrix 54 comprises conventional ATM switching fabric hardware.

The BUS module 74 comprises a conventional LAN switch adapted in accordance with the present invention. The BUS module comprises an ATM physical interface port 78, BUS engine 80 and a plurality of Ethernet ports 86, labeled Ethernet port #1 through Ethernet port #5. Each Ethernet port comprises a Tx portion 88 and an Rx portion 90. The BUS engine 80 comprises an ATM to Ethernet forwarding table 82 and an Ethernet to ATM forwarding table 84.

The conventional LAN switch and ATM switch are modified and adapted to implement the BUS entity of the present invention. The BUS engine 80 in the BUS module is adapted to provide the following functionality: (1) segmentation and re-assembly (SAR) means so as not to have interleaving frames, and (2) high performance forwarding engine means having fast switching times and low latency. Note that the SAR means and forwarding engine means are built into the majority of commercially available LAN/ATM switches.

The BUS engine 80 is connected on one side to the physical ATM interface port 78 and on the other side to one or more Ethernet ports 86. In accordance with the invention, the Ethernet ports are configured to be looped back either internally or externally. Ethernet ports #1 and #2 are shown connected via an external loopback 92 while Ethernet port #5 is shown configured having an internal loopback 94. External loopbacks are always configured in pairs from the Tx portion of one port to the Rx portion of the other port. Internal loopbacks are typically configured on a single port. Either type of loopback is suitable for use with the present invention.

The Ethernet ports themselves may comprise any type of Ethernet port, i.e., Fast Ethernet 100BaseT, Gigabit Ethernet 100BaseT, etc. Note, however, that the faster the Ethernet interface, the higher the performance of the BUS module. With a suitably fast Ethernet interface port, the limiting factor becomes the ATM interface port speed. For example, consider an OC-3 (155 Mbps) ATM connection and a Gigabit Ethernet port. In this example, the ATM physical interface port speed will limit the throughout of the BUS module. Frames destined to the BUS will be switched at nearly port speed and sent back out on the ATM interface.

In operation, the BUS engine 80 assembles Ethernet frames from ATM cells received from the ATM physical interface port 78. It then forwards the Ethernet frames to one of the Ethernet interface ports 86. Due to the loopback configuration, the Ethernet frame is returned to the BUS engine which is operative to divide the Ethernet frame into a plurality of ATM cells. The ATM cells are then forwarded to the ATM port.

Note that each BUS entity can service only a single ELAN. Each BUS module, however, can be adapted to service a plurality of ELANs. For each ELAN, the BUS engine is configured to forward frames to a particular Ethernet port or pair of Ethernet ports, depending on whether internal or external loopbacks are utilized. Each Ethernet port or pair of Ethernet ports can be configured to serve a different ELAN. For example, Ethernet ports #1 and #2 can be configured to serve ELAN #1 and Ethernet ports #3 and #4 can be configured to serve ELAN #2.

The switching fabric in the BUS engine within the LAN switch is adapted to perform the segmentation and re-assembly (SAR) function of a standard BUS entity whereby ATM cells are assembled into Ethernet frames, forwarded and segmented back to ATM cells. In operation, one or more Multicast Send VCCs transmit traffic destined for the BUS to the modified LAN switch of the present invention. The switching fabric in the BUS engine is configured to switch the received traffic to an appropriate outbound Ethernet port. The outbound Ethernet port is looped backed and the frame is input to the switching fabric. The switching fabric is configured to output the traffic to the appropriate Multicast Forward VCC for distribution to the LECs.

Note that in accordance with the present invention, the BUS module may be constructed as a stand alone unit communicating with the ATM switch via the ATM cloud 70 or can be constructed to be integral with the ATM switch. In this case, the ATM switch communicates with the BUS module via internal signal paths 71, i.e., internal data/control bus.

This process will now be described in more detail with reference to FIGS. 4, 5 and 6. Note that the method of establishing a LEC-BUS connection is different depending on whether the connection is for the first LEC in the ELAN or for the second or beyond LEC. Both methods are described beginning with method for the first LEC.

Establishment of LEC-BUS Connection—First LEC

Figure 5:
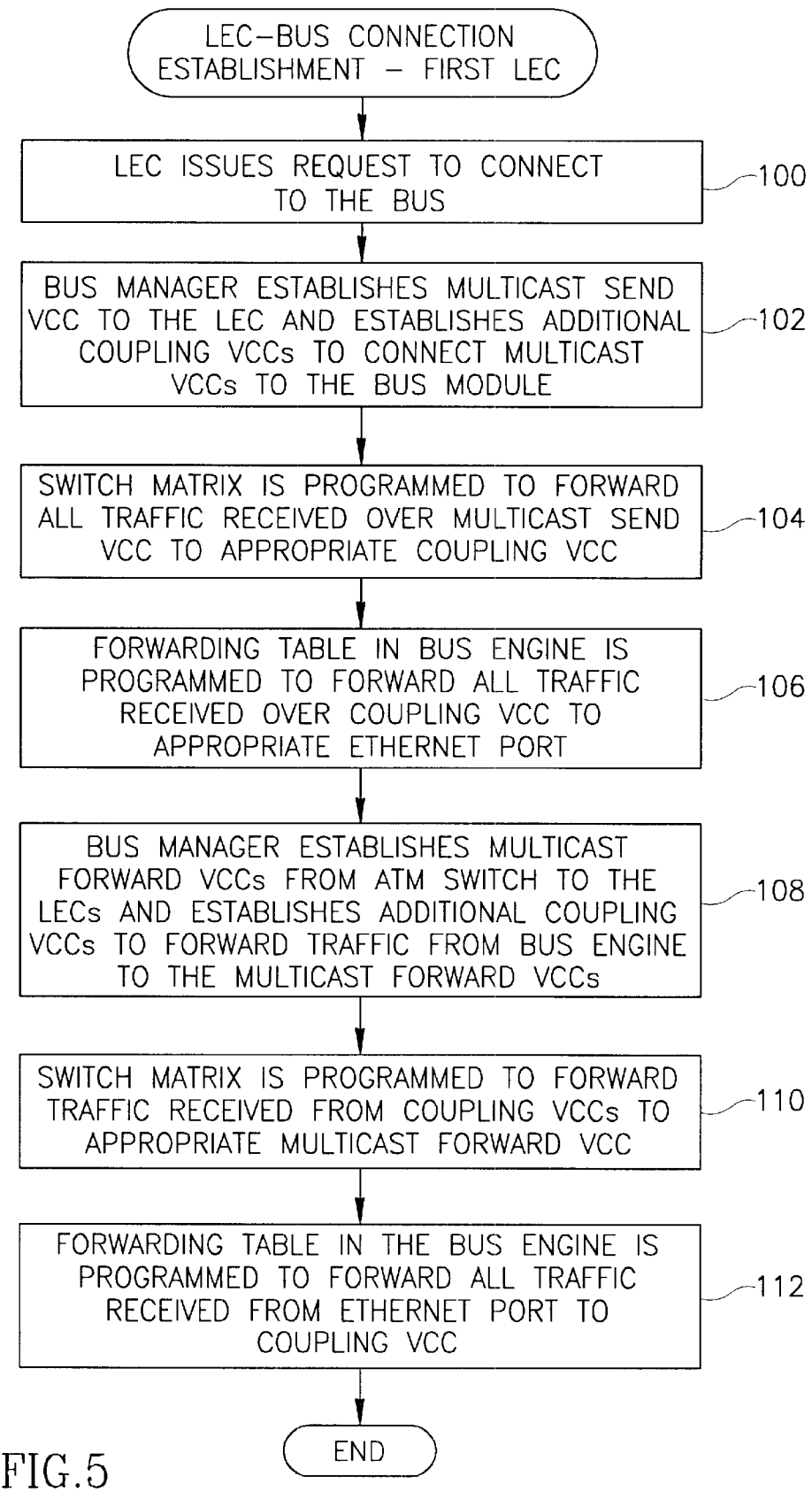
FIG. 5 is a flow diagram illustrating a first method of the present invention of establishing a LEC-BUS connection for the first LEC.
Figure 6:
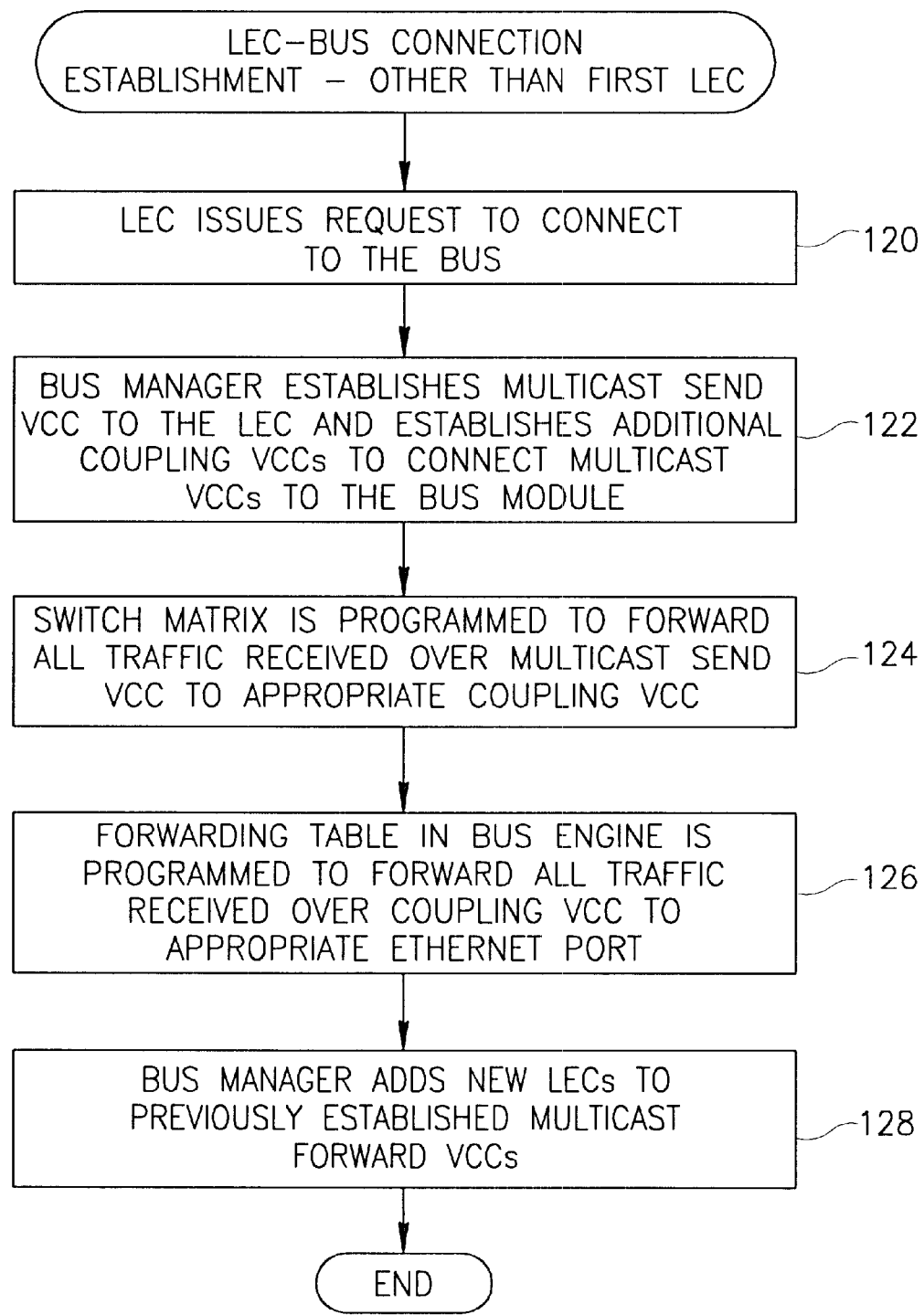
FIG. 6 is a flow diagram illustrating a second method of the present invention of establishing a LEC-BUS connection for LECs other than the first LEC.

A flow diagram illustrating a first method of the present invention of establishing a LEC-BUS connection for the first LEC is shown in FIG. 5. When the first LEC from a particular ELAN connects to the BUS, both the Multicast Send VCC and the Multicast Forward VCC are established. The example network illustrated in FIG. 4 is referenced to aid in understanding the principles of the present invention. The example illustrates the process when first LECs (LEC #1 and LEC #3) from two different ELANs (ELAN #1 and #2) connect to the BUS module.

Initially, the first LEC issues a request to connect to the BUS (step 100). The request is generated by LEC #1 in ELAN #1 and LEC #3 in ELAN #2. The requests are received by the BUS manager in the ATM switch which is operative to handle requests to connect to the BUS. The BUS manager establishes a Multicast Send VCC from itself to the LEC and establishes coupling VCCs to connect the Multicast Send VCCs from the BUS manager to the BUS module (step 102). The coupling VCCs steer the traffic switched from the Multicast Send VCCs to the BUS engine in the BUS module. The coupling VCCs are established so as to connect the BUS manager to the BUS module using any suitable protocol, either via the ATM cloud 70 or via a direct internal connection 71.

The switch matrix 54 in the ATM switch is configured to forward all traffic received over the Multicast Send VCC to the appropriate VCC (step 104). In particular, the switch matrix is programmed to switch traffic received over the Multicast Send VCC associated with LEC #1 (Msend-1) to a coupling VCC (VCC-1) connecting the BUS manager with the BUS module. Similarly, the switch matrix is programmed to switch traffic received over the Multicast Send VCC (Msend-2) associated with LEC #3 to a coupling VCC (VCC-3) connecting the BUS manager with the BUS module.

The ATM to Ethernet forwarding table 82 in the BUS module is configured to forward all traffic received over the coupling VCC to the appropriate Ethernet port (step 106). In this example, the forwarding table is programmed to forward traffic received over coupling VCC-1 to Ethernet port #1. Similarly, the forwarding table is programmed to forward traffic received over coupling VCC-3 to Ethernet port #5 (Tx portion).

The BUS manager establishes Multicast Forward VCCs from the ATM switch to the LECs and establishes additional coupling VCCs to forward traffic from the BUS engine to the Multicast Forward VCCs (step 108). In particular, a Multicast Forward VCC (MFwd-1) is established from the BUS manager in the ATM switch to LEC #1 and a Multicast Forward VCC (MFwd-2) is established from the BUS manager in the ATM switch to LEC #3. In addition, a coupling VCC (VCC-2) is established to forward traffic from the BUS engine in the BUS module to the Multicast Forward VCC (MFwd-1) associated with LEC #1. Similarly, a coupling VCC (VCC-4) is established to forward traffic from the BUS engine in the BUS module to the Multicast Forward VCC (MFwd-2) associated with LEC #3. Note that the coupling VCCs (VCC-2 and VCC-4) are established either via the ATM cloud 70 or via internal connection 71 (if the BUS module is integral with the ATM switch) via any suitable protocol.

The switch matrix is configured to forward traffic received from coupling VCCs to the appropriate Multicast Forward VCC (step 110). In particular, the switch matrix 54 is programmed to forward traffic received from coupling VCC-2 to Multicast Forward VCC (MFwd-1). Likewise, the switch matrix is programmed to forward traffic received from coupling VCC-4 to Multicast Forward VCC (MFwd-2).

The Ethernet to ATM forwarding table 84 in the BUS engine 80 is configured to forward all traffic received from the Ethernet port to the appropriate coupling VCC (step 112). In particular, the traffic output from the Tx of Ethernet port #1 is looped back to the Rx of Ethernet port #2 via external loop back 92. The forwarding table 82 is configured to forward traffic received from Ethernet port #2 to coupling VCC-2. Similarly, the traffic output from the Tx of Ethernet port #5 is looped back to the Rx of Ethernet port #5 via internal loop back 94. The forwarding table 82 is configured to forward traffic received from Ethernet port #5 to coupling VCC-4.

Note that the BUS engine is operative to assemble the received ATM cells into Ethernet frames before forwarding them to the appropriate Ethernet port. The BUS engine is also operative to segment the Ethernet frames received from the Ethernet port into ATM cells before forwarding them to the appropriate coupling VCC.

Establishment of LEC-BUS Connection—Other Than First LEC

When a LEC other than the first LEC from a particular ELAN wishes to connect to the BUS, only the Multicast Send VCC needs to be established. Since the Multicast Forward VCC already exists, it does not need to be established again. The LEC simply joins the already established Multicast Forward VCC.

A flow diagram illustrating a second method of the present invention of establishing a LEC-BUS connection for LECs other than the first LEC is shown in FIG. 5. When the first LEC from a particular ELAN connects to the BUS, both the Multicast Send VCC and the Multicast Forward VCC are established. In this case, only the Multicast Send VCCs need be established. The following example illustrates the process when LECs (LEC #2 and LEC #4 which are not the first LECs) from two different ELANs (ELAN #1 and #2) connect to the BUS module.

Initially, the LEC issues a request to connect to the BUS (step 120). The request is generated by LEC #2 in ELAN #1 and LEC #4 in ELAN #2. The requests are received by the BUS manager in the ATM switch which is operative to handle requests to connect to the BUS. The BUS manager establishes a Multicast Send VCC from itself to the LEC and establishes coupling VCCs to connect the Multicast Send VCCs from the BUS manager to the BUS module (step 122). The coupling VCCs steer the traffic switched from the Multicast Send VCCs to the BUS engine in the BUS module. The coupling VCCs are established so as to connect the BUS manager to the BUS module using any suitable protocol, either via the ATM cloud 70 or via a direct internal connection 71.

The switch matrix 54 in the ATM switch is configured to forward all traffic received over the Multicast Send VCC to the appropriate VCC (step 124). In particular, the switch matrix is programmed to switch traffic received over the Multicast Send VCC associated with LEC #2 (Msend-3) to a coupling VCC (VCC-5) connecting the BUS manager with the BUS module. Similarly, the switch matrix is programmed to switch traffic received over the Multicast Send VCC (Msend-4) associated with LEC #4 to a coupling VCC (VCC-6) connecting the BUS manager with the BUS module.

The ATM to Ethernet forwarding table 82 in the BUS module is configured to forward all traffic received over the coupling VCC to the appropriate Ethernet port (step 126). In this example, the forwarding table is programmed to forward traffic received over coupling VCC-5 to Ethernet port #1. Similarly, the forwarding table is programmed to forward traffic received over coupling VCC-6 to Ethernet port #5 (Tx portion).

The BUS manager then adds the new LECs (i.e., LECs #2 and #4) to the existing Multicast Forward VCC connecting the ATM switch to the LECs (step 128). Similarly, the coupling VCCs for forwarding traffic from the BUS engine to the Multicast Forward VCCs already exist and do not need to be established. In particular, LEC #2 is added to the Multicast Forward VCC (MFwd-1) and LEC #4 is added to the Multicast Forward VCC (MFwd-2). The coupling VCC (VCC-2) already exists to forward traffic from the BUS engine in the BUS module to the Multicast Forward VCC (WFwd-1) associated with ELAN #1. Similarly, a coupling VCC (VCC-4) already exists to forward traffic from the BUS engine in the BUS module to the Multicast Forward VCC (MFwd-2) associated with ETAN #2.

The switch matrix is already configured to forward traffic received from the coupling VCCs to the appropriate Multicast Forward VCC. The switch matrix is already configured to forward traffic received from coupling VCC-2 to Multicast Forward VCC (MFwd-1) and to forward traffic received from coupling VCC-4 to Multicast Forward VCC (MFwd-2).

All traffic forwarded to Ethernet port #1 is looped back to Ethernet port #2. The Ethernet to ATM forwarding table 84 in the BUS engine 80 is also already configured to forward all traffic received from the Rx of Ethernet port #2 to coupling VCC-2 and in turn to Multicast Forward VCC-1. Similarly, the Ethernet to ATM forwarding table is also already configured to forward all traffic received from the Rx of Ethernet port #5 to coupling VCC-4 and in turn to Multicast Forward VCC-2.

Thus, the BUS module of the present invention is operative to perform the functions of a standard LANE BUS entity in hardware, utilizing the switching fabric of a LAN switch adapted to operate as a BUS engine. Using the BUS engine of the invention, the re-assembly and segmentation of ATM cells to frames and the forwarding of traffic from the Multicast Send VCCs to the Multicast Forward VCCs is accomplished using hardware. This yields a much higher performance for the BUS and provides the capability to transfer very high levels of BUS traffic. The throughput of the BUS module is limited by the speed of the Ethernet ports used and the data rate of the ATM physical interface As described previously given a LAN switch having Gigabit Ethernet ports and an ATM physical interface of OC-3 data rates, the throughput of the BUS would be limited by the speed of the ATM interface.

While the invention has been described with respect to a limited number of embodiments, it will be appreciated that many variations, modifications and other applications of the invention may be made.

What is claimed is:

1. A Broadcast and Unknown Server (BUS) entity for use in an Asynchronous Transfer Mode (ATM) network including one or more LAN Emulation Clients (LECs), said BUS entity comprising:

a BUS manager adapted to establish a Multicast Send Virtual Channel Connection (VCC) and a Multicast Forward VCC to one or more LECs and to establish coupling VCCs between a BUS engine and said Multicast Send and Multicast Forward VCCs;

an ATM switch matrix adapted to forward traffic received over said Multicast Send VCC to said BUS engine via a coupling VCC, and to forward traffic received from said BUS engine via a coupling VCC to said Multicast Forward VCC; and said BUS engine adapted to assemble Ethernet frames from ATM cell traffic received from said Multicast Send VCC via said coupling VCC and to forward the assembled Ethernet frames to one or more Ethernet ports configured in loopback, said BUS engine adapted to segment Ethernet frames received over said loopback into ATM cells and to forward said ATM cells to said Multicast Forward VCC via said coupling VCC.

2. The BUS entity according to claim 1, wherein one or more of said Ethernet ports are configured in external loopback.

3. The BUS entity according to claim 1, wherein one or more of said Ethernet ports are configured in internal loopback.

4. The BUS entity according to claim 1, wherein said BUS engine comprises an ATM to Ethernet forwarding table.

5. The BUS entity according to claim 1, wherein said BUS engine comprises an Ethernet to ATM forwarding table.

6. The BUS entity according to claim 1, wherein said BUS manager communicates with said BUS engine over the ATM network.

7. The BUS entity according to claim 1, wherein said BUS manager communicates with said BUS engine via an internal data communication bus.

8. The BUS entity according to claim 1, further comprising:

means for establishing additional Multicast Send VCCs, one Multicast Send VCC established for each additional LEC wishing to connect to said BUS entity; and means for adding each additional LEC wishing to connect to said BUS entity to said Multicast Forward VCC.

9. A method of implementing a Broadcast and Unknown Server (BUS) entity in an Asynchronous Transfer Mode (ATM) network including an ATM switch having a BUS manager, a BUS module having a BUS engine and a plurality of Ethernet ports and one or more LAN Emulation Clients (LECs), said method comprising the steps of:

establishing a Multicast Send Virtual Channel Connection (VCC) and a Multicast Forward VCC to a first LEC;

establishing a first coupling VCC connecting said Multicast Send VCC to said BUS engine and a second coupling VCC connecting said BUS engine to said Multicast Forward VCC;

forwarding traffic received over said Multicast Send VCC to said first coupling VCC;

forwarding traffic received over said first coupling VCC to an Ethernet port;

configuring said Ethernet ports to be in loopback configuration;

forwarding traffic received from an Ethernet port to said second coupling VCC;

forwarding traffic received from said second coupling VCC to said Multicast Forward VCC.

10. The method according to claim 9, wherein said step of forwarding traffic received over said first coupling VCC comprises the step of re-assembling ATM cells to form Ethernet frames.

11. The method according to claim 9, wherein said step of forwarding traffic received from a receive portion of said Ethernet port comprises the step of segmenting Ethernet frames to form ATM cells.

12. The method according to claim 9, wherein one or more Ethernet ports are configured in external loopback.

13. The method according to claim 9, wherein one or more Ethernet ports are configured in internal loopback.

14. A Broadcast and Unknown Server (BUS) entity for use in an Asynchronous Transfer Mode (ATM) network including one or more LAN Emulation Clients (LECs), said BUS entity comprising:

a BUS manager adapted to establish a Multicast Send Virtual Channel Connection (VCC) and a Multicast Forward VCC to one or more LECs and to establish coupling VCCs between a LAN switch and said Multicast Send and Multicast Forward VCCs;

means for forwarding traffic received over said Multicast Send VCC to said LAN switch via a coupling VCC, and to forward traffic received from a coupling VCC to said Multicast Forward VCC; and an Ethernet LAN switch comprising a plurality of Ethernet ports configured in loopback, said LAN switch adapted to perform segmentation and reassembly (SAR) and forwarding functions so as to emulate a LANE based BUS entity wherein said LAN switch is adapted to assemble Ethernet frames from ATM cell traffic received from said Multicast Send VCC via said coupling VCC and to forward assembled Ethernet frames to said loopback Ethernet ports, and wherein said LAN switch is adapted to segment Ethernet frames received over said loopback into ATM cells and to forward said. ATM cells to said Multicast Forward VCC via said coupling VCC for distribution to LECs.

15. The BUS entity according to claim 14, wherein each Ethernet port is adapted to serve a different ELAN.

16. The BUS entity according to claim 14, wherein LAN switch communicates with said BUS manager via an ATM network.

17. The BUS entity according to claim 14, wherein LAN switch communicates with said BUS manager via one or more internal signal paths.

* * * * *